United States Patent Office 2,914,099
Patented Nov. 24, 1959

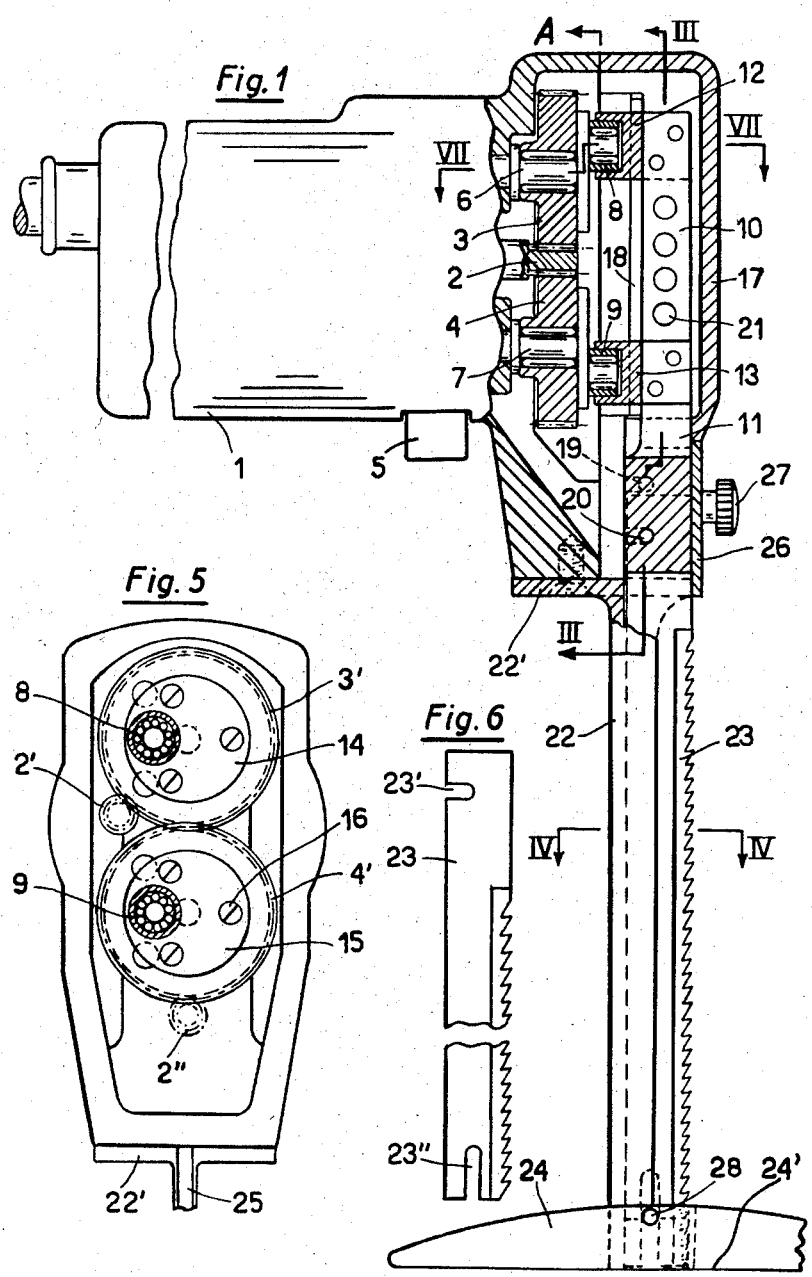

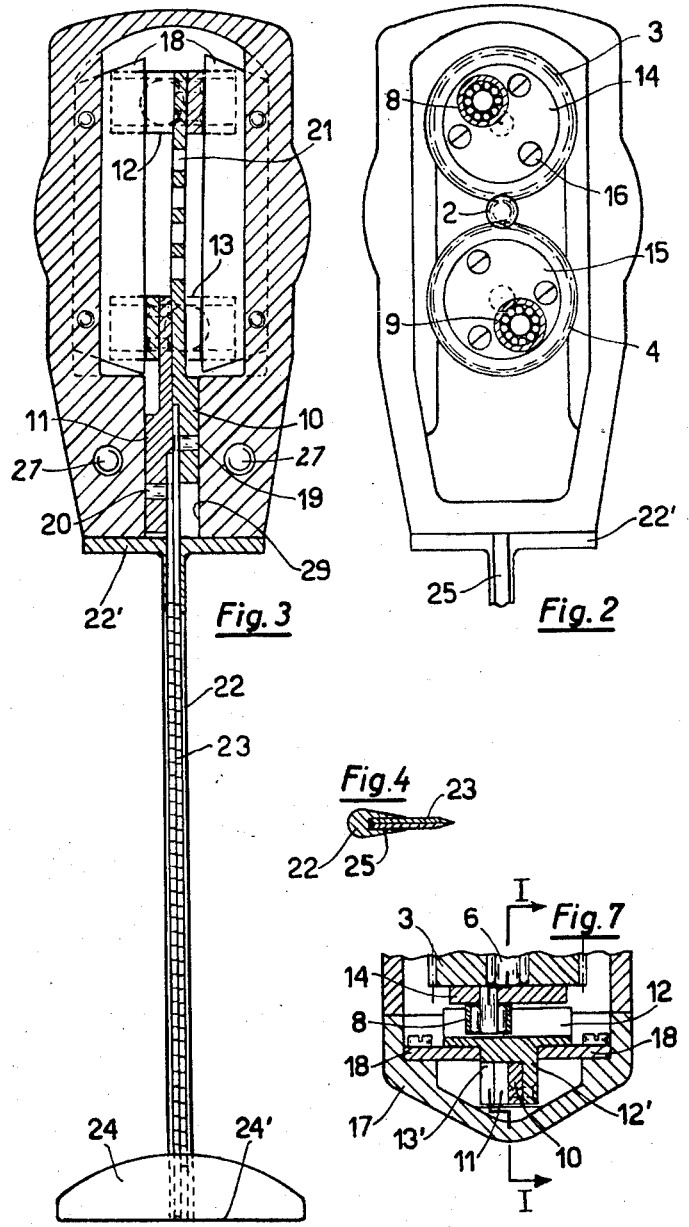

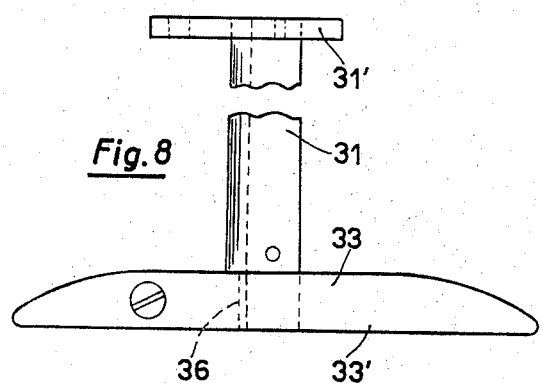
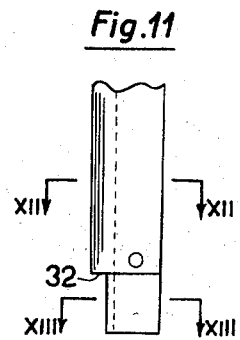
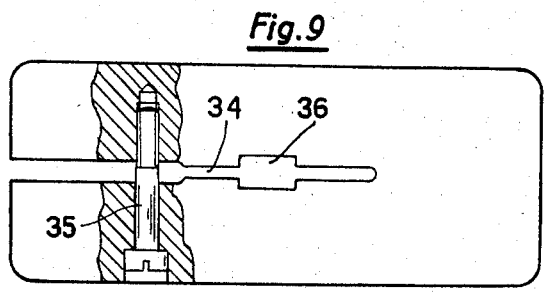
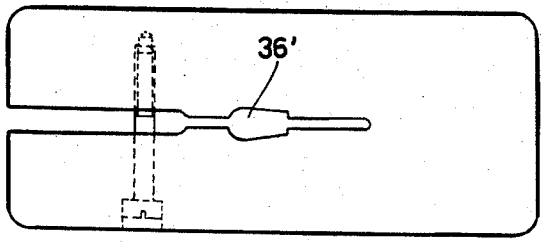

2,914,099

POWER HAND CUTTING TOOL

Albert Kaufmann, Soleure, Switzerland, assignor to Scintilla Ltd., Soleure, Switzerland Application December 27, 1955, Serial No. 555,718

Claims priority, application Switzerland April 6, 1955

5 Claims. (Cl. 143—68)

The present invention relates to cutting tools, and in particular to power hand cutting tools adapted to cut soft foam materials.

Particular problems are involved in form-cutting from fairly thick sheets of very soft foam rubber or foam plastics of any type. In particular, difficulties arise in cutting such a material with a power hand cutting tool.

One of the objects of the present invention is to provide a power hand cutting tool capable of simultaneously reciprocating a pair of cutting members in opposite directions for cutting foam materials of the type referred to above.

Another object of the present invention is to provide a cutting tool of the above type which is of a fairly light weight and small size and which can be comfortably and easily manipulated by the operator to cut the work material in any desired direction.

A further object of the present invention is to provide a cutting tool of the above type capable of simultaneously reciprocating a pair of cutting blades in opposite directions with a minimum of unbalance.

An additional object of the present invention is to provide a cutting tool capable of removably receiving a pair of cutting blades in a simple quick manner and capable of having the cutting blades easily and quickly removed therefrom.

Also, it is an object of the present invention to provide a cutting tool capable of simultaneously reciprocating in opposite directions a pair of cutting blades which are of identical size.

Also, it is an object of the present invention to provide a cutting tool of the above type with a means for guiding the cutting blades not only in a direction normal to a surface on which the work material is located but also in any desired direction with respect to this surface.

Still another object of the present invention is to provide a cutting tool with a means for removably connecting to a stand which guides the cutting blades a base member capable of supporting the stand as well as participating in the guiding of the cutting blades.

Furthermore, it is an object of the present invention to provide a structure capable of accomplishing all of the above objects and at the same time composed of simple and ruggedly connected elements which are very reliable in operation.

With the above objects in view, the present invention mainly consists of a power hand cutting tool which includes a support means formed with an elongated cutout open at the front and bottom of the support means and having a pair of parallel side surfaces. A pair of tool carriers slidably engage each other and are in sliding engagement with the side surfaces of the cutout. The support means carries a reciprocating means operatively connected to the tool carriers for simultaneously reciprocating the same in opposite directions in the cutout of the support means. A pair of cutting blades are connected to the tool carriers and extend therefrom beyond the bottom of the support means to reciprocate with the tool carriers. A plate is removably fixed to the front of the support means and covers the cutout therein to releasably retain the cutting blades in operative engagement with the tool carriers. A stand is fixed to and extends from the bottom of the support means and is formed with a longitudinal groove in which the cutting blades extend to be guided by the stand, and a base is fixed to the free end of the stand distant from the support means to support the stand.

The novel feature which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly broken away partly sectional side elevational view of one possible construction of a portable cutting tool according to the present invention, the operating head which is shown in section in Fig. 1 being taken along section line I—I of Fig. 7 in the direction of the arrows;

Fig. 2 is a front view of the operating head of the tool of the invention as seen in the direction of arrow A of Fig. 1 with the front wall of the operating head removed to show the structure behind the same;

Fig. 3 is a sectional elevational view of the tool of Fig. 1 taken along line III—III of Fig. 1 in the direction of the arrows;

Fig. 4 is a sectional plan view of the stand of the cutting tool of Fig. 1 and is taken along line IV—IV of Fig. 1 in the direction of the arrows;

Fig. 5 is a view analogous to Fig. 2 showing a different embodiment of a reciprocating means according to the present invention;

Fig. 6 is a partly broken away side elevational view of a cutting blade used in the cutting tool of the present invention;

Fig. 7 is a fragmentary sectional view taken along line VII—VII of Fig. 1 in the direction of the arrows and turned through 90° for the sake of convenience;

Fig. 8 is a partly broken away side elevational view of an embodiment of a base and stand different from the embodiment of the base and stand shown in Figs. 1 and 3;

Fig. 9 is a top plan view, partly in section, of the base of Fig. 8 without the stand;

Fig. 10 shows in top plan view a base of a slightly different form from the base of Fig. 9;

Fig. 11 is a fragmentary side elevational view of the lower end portion of the stand of the embodiment of Fig. 8;

Fig. 12 is a sectional view taken along line XII—XII of Fig. 11 in the direction of the arrows;

Fig. 13 is a sectional view taken along line XIII—XIII of Fig. 11 in the direction of the arrows;

Fig. 14 is a fragmentary elevational view similar to Fig. 11 of the lower end of a different embodiment of a stand according to the present invention; and Fig. 15 is an end view of the stand of Fig. 14 as seen in the direction of arrow B of Fig. 14.

Referring now to Fig. 1, the tool of the present invention includes a support means 1 which forms a hand grip for the tool and which houses an unillustrated electric motor capable of being connected to any suitable source of current. The shaft of the electric motor supported by the support means 1 fixedly carries a pinion 2 shown in Figs. 1 and 2, this pinion 2 being located between and meshing with a pair of identical gears 3 and 4. These identical gears have the same number of teeth, and the motor is started and stopped by a manually operable switch button 5 so that whenever the motor is started by actuation of the switch button 5 the gears 3 and 4 immediately turn in opposite directions at the same speed. The support means 1 fixedly carries a pair of parallel pins 6 and 7 which extend into axial bores of the gears 3 and 4, respectively, to rotatably support the latter for rotation about their respective axes. The gears 3 and 4 respectively carry for rotation a pair of freely turnable rolls 8 and 9 which are located forwardly of the gears 3 and 4, and as is particularly evident from Fig. 2, the rolls 8 and 9 are eccentrically located with respect to the axes of rotation of the gears 3 and 4. The rolls 8 and 9 are turnably supported by roller bearings which engage pins extending eccentrically from the gears 3 and 4 in a direction parallel to the axes thereof, respectively. These pins are located at the same radial distances from the axes of gears 3 and 4, as is evident from Fig. 2.

The rolls 8 and 9 respectively extend into grooves of a pair of transmission members 12 and 13, these grooves extending horizontally, as viewed in Fig. 3. The transmission members 12 and 13 are respectively fixed to tool carriers 10 and 11. In order that the rolls 8 and 9 may turn freely, they have a slightly smaller outer diameter than the width of the grooves of the transmission members 12 and 13 into which they respectively extend.

As long as the pins which rotatably support the rolls 8 and 9 are located at a certain minimum distance from the turning axes of the gears 3 and 4, these pins may be fixed directly to the gears 3 and 4. However, if the radial distances of these pins from the axes of the gears 3 and 4 is so small that these pins come in conflict with the axial bores of the gears 3 and 4, then the pins are fixed, as shown in Figs. 1 and 2, to a pair of plates 14 and 15 which are respectively fixed to the front faces of the gears 3 and 4 by the screws 16.

It is apparent that if the transmission members 12 and 13 are guided for movement in a direction normal to the direction in which the grooves of the transmission members extend, then the rolls 8 and 9 within the grooves of the transmission members convert the rotating motion of the gears 3 and 4 into reciprocation of the transmission members 12 and 13 simultaneously in opposite directions. The transmission members 12 and 13 are in fact guided for such reciprocating movement by a guide means which includes a pair of guide members 18 fixed to the operating head 17 of the support means 1. As is apparent particularly from Fig. 3, the guide members 18 are spaced from each other and have a pair of parallel guide edges which define between themselves an elongated guide space which extends normal to the grooves of the transmission members 12 and 13. The transmission member 12 is provided with a rigid extension 12' which extends between and slidably engages the guide edges of the guide members 18, as is shown most clearly in Figs. 3 and 7, this extension 12' extending forwardly beyond the guide members 18 and having a substantially L-shaped configuration as shown in Fig. 7. The transmission member 13 is provided in a similar manner with a projecting portion 13' which also extends through the guide members 18 and is in slidable engagement therewith, this extension 13' of the transmission member 13 being rigid with the latter and having a substantially L-shaped cross section which is directed oppositely to the L-shaped cross section of the transmission member 12'. Thus, the portion of extension 13' which extends forwardly beyond the guide members 18 is located next to the left guide member 18 of Figs. 3 and 7, while the portion of extension 12' which extends forwardly beyond the guide members 18 is located next to the right guide member 18 of Figs. 3 and 7.

The tool carriers 10 and 11 are fixedly connected to the portions of extensions 12' and 13' which extend forwardly beyond the guide members 18 by any suitable means such as the rivets indicated in the drawings. The support means 1 is formed with an elongated cutout 29 which is open at the front and bottom of the support means 1 and which is provided with a pair of opposite parallel side surfaces which slidably engage the tool carriers 10 and 11, as is shown most clearly in Fig. 3, the tool carriers 10 and 11 in turn slidably engaging each other and both being located within the cutout 29.

As is apparent from Fig. 3, the tool carriers 10 and 11 do not engage each other at their bottom end portions where they are provided with faces directed toward but spaced from each other. These bottom end portions of the tool carriers 10 and 11 fixedly carry a pair of pins 19 and 20, respectively, which do not project from the tool carriers through a distance sufficient to interfere with the reciprocating movement thereof in opposite directions simultaneously, as is apparent from Fig. 3 which indicates the extent to which the pins 19 and 20 extend beyond the outer faces of the tool carriers 10 and 11 which are directed toward each other. These pins 19 and 20 are adapted to be connected at their free end portions which extend beyond the tool carriers 10 and 11 to cutting blades which are operatively connected to the tool carriers without the use of any fastening means similar to screw members or the like.

It is apparent that during rotation of the gears 3 and 4 the rolls 8 and 9 will respectively reciprocate back and forth in the grooves of the transmission members 12 and 13. These rolls 8 and 9 will have a predetermined stroke in these grooves, respectively, and during movement in one direction along these grooves the rolls 8 and 9 will respectively move simultaneously through the central part of their respective strokes. The pins 19 and 20 are arranged so that they will be coaxial with each other when the rolls 8 and 9 are located at this central part of their strokes during movement of these rolls 8 and 9 in a given direction along the grooves of the transmission members 12 and 13. Because of the different elevations of the transmission members 12 and 13 and the fact that the pins 19 and 20 are coaxial with each other at a given instant during the operation, it is evident that the carriers 10 and 11 must have different lengths and in the example illustrated the carrier 10 is longer than the carrier 11. However, in order to reduce unbalanced forces produced by rapid reciprocation of the carriers 10 and 11 to a minimum, the longer tool carrier 10 is formed with a plurality of cutouts 21 which give to the tool carrier 10 a mass substantially equal to that of the tool carrier 11, and thus undesirable unbalanced forces are reduced to a minimum.

The cutting blades 23 are relatively thin and slidably engage each other, and moreover the two cutting blades 23 used with the tool of the invention are in the form of saw blades which are of an identical size. Fig. 4 clearly illustrates the manner in which the blades 23 slidably engage each other, and furthermore Fig. 4 shows the manner in which the pair of cooperating blades 23 are provided at their cutting teeth with opposite inclined outer cutting faces which approach each other to form a single cutting edge portion the two halves of which are respectively formed by the blades 23 which slide with respect to each other in opposite directions simultaneously.

A stand 22 is provided to guide the cutting blades 23 for reciprocating movement, this stand 22 being formed with a longtiudinal groove 25 in which both cutting blades 23 are located in the manner shown in Fig. 4 so as to be slidably guided by the stand 22. The top end of the stand 22 is rigid with a plate 22' which is fixed to the operating head 17 of the support means 1 so that the stand 22 extends downwardly beyond the support means. A screw member is indicated in dot dash lines in Fig. 1 to show how the plate 22' is fixed to the support means 1. Furthermore, it will be noted that the top end of the groove 25 is open and communicates with the cutout 29 so that the blades which are connected to the tool carriers 10 and 11 may extend from the cutout 29 directly into the longitudinal guiding groove 25 of the stand 22. The bottom end portion of the stand 22 is fixed to a base 24 which is provided with a bottom surface 24' adapted to engage a surface of a work table or the like, for example, along which the tool may be moved by hand by sliding the surface 24' on the work surface. Such a work surface is adapted to carry a foam material of the type referred to above to be cut by the blades 23.

Each of the blades 23 is provided with a transversely extending notch 23' adjacent its top end (Fig. 6), and in order to place the blades 23 in driving engagement with the carriers 10 and 11, respectively, it is only necessary to locate the pins 19 and 20 respectively within the cutouts 23' of the blades 23 when the latter are located within the groove 25 of the stand 22. In this way a driving engagement between the cutting blades and the tool carriers 10 and 11, respectively, is provided in an extremely simple and effective manner. Each of the cutting blades 23 is furthermore provided at its bottom end with a longitudinally extending notch 23'', and a transverse guide pin 28 extends through the notches 23'' in order to contribute to the guiding of the blades 23 for longitudinal reciprocating movement. The cross pin 28 may be carried at the bottom end of the stand 22 in a position extending across the groove 25 thereof, or the guide pin 28 may be carried by the base 24 in a position extending across the cutout thereof into which the stand and saw blades extend, in the manner shown in dotted lines in Fig. 3. The base 24 is provided with an opening in which the stand is located, the stand 22 being fixed to the base 24, and the opening in the base 24 also accommodates the blades 23 for reciprocating movement at their bottom ends. A plate 26 covers the front open portion of the opening 29 and is removably fixed to the operating head 17 of the support means 1 by a pair of screw members 27 which extend through suitable openings of the plate 26 into threaded openings of the support means 1, the screw members 27 being provided with knurled heads so that they may be easily operated manually. Thus, when the blades 23 are to be connected to the carriers 10 and 11 it is only necessary to manually remove these screws 27 and the plate 26 and to move the blades 23 in side by side relation into the groove 25 while simultaneously locating the pins 19 and 20 respectively within the notches 23' of the blades 23. As the blades 23 are inserted into the groove 25, their bottom ends are first positioned so that the pin 28 extends through the notches 23'' and then the blades are turned into the groove 25 and the notches 23' are aligned with the pins 19 and 20 so as to receive the latter. With the blades thus located in position the plate 26 is replaced so that it is not possible for the blades to loose their driving engagement with the pins 19 and 20, the blades having front smooth edges which slidably engage the inner face of the plate 26, as evident from Fig. 1. The blades 23 are removed with the reverse of these operations. Thus, when it is desired to remove blades 23 in order to replace them with sharper blades, for example, it is only necessary to remove the screws 27 so as to permit the plate 26 to be removed and then the blades can easily be turned out of the groove 25 and a new pair of blades can be placed in operative position in the manner described above. Thus, without the use of any tools whatsoever it is possible quickly and easily to exchange a pair of dull blades for a pair of sharp blades.

It should be noted that the invention is not necessarily limited to the structure described above and shown in Figs. 1 and 2. Thus, the principle of operation of the invention can be carried out in the manner shown in Fig. 5 which shows the gears 3' and 4' which respectively correspond to the gears 3 and 4 meshing with each other. The motor within the support means 1 drives the pinion 2', and with this arrangement it is only necessary to relocate the motor within the support means 1 so that the axis of the motor coincides with the axis of the pinion 2'. In the example shown in Fig. 5 the pinion 2' meshes with the gear 3' so that when the latter is driven the gear 4' will also be driven in an opposite direction. If it is desired to maintain the symmetrical arrangement of the structure while at the same time maintaining the gears 3' and 4' in mesh with each other, then the pinion 2' may be located in the position of the pinion 2'' shown in dot dash lines in Fig. 5, and with this arrangement it is only necessary to locate the motor at a lower elevation than that indicated in Fig. 1, the support means 1 being shaped so as to accommodate the motor in this position.

The cutting tool described above is capable of being very easily operated by hand so as to cut foam material with the cutting blades 23 extending normal to the surface which is slidably engaged by the bottom face 24' of the base 24. Experience has shown that where it is desired to cut in planes other than planes which are normal to the face 24' of the base 24, it is an exceedingly simple matter to simply hold the tool in a tilted position and to cut in any desired plane whatsoever. However, when cutting in such an angular position, the base 24 sometimes is undesirable since it gets in the way of the movement of the cutting tool under certain circumstances, and for this reason the embodiment of the invention shown in Fig. 8 may be desired where the base 33 which corresponds to the base 24 is removably connected to the stand 31 which corresponds to the stand 22.

Thus, referring to Fig. 8, it will be seen that the stand 31 which is provided in the same way as the stand 22 with a groove for guiding the cutting blades, is rigidly fixed at its top end to a plate 31' as by being soldered or welded thereto, this plate 31' corresponding to the plate 22' and being adapted to fix the stand 31 to the operating head of the support means of the cutting tool. The bottom end of the stand 31 is removably connected to the base 33. Thus, as is indicated in Fig. 9 the base 33 is provided with an elongated cutout 34 which extends through the base 33 from the top to the bottom thereof and which extends into the base 33 from the rear edge thereof. Thus, the elongated cutout 34 divides the base 33 into a pair of portions which may be drawn toward each other by a screw means in the form of the screw 35 shown in Fig. 9 which has a head engaging a shoulder formed in a bore of the base 33 and which threadedly engages the portion of the base on the other side of the slot 34 from that which engages the head of the screw 35, so that this screw 35 may be turned to draw together the portions of the base 33 which are separated by the groove 34.

Approximately in the central portion of the base 33 the groove 34 is provided with a widened portion 36 composed of a pair of identical surfaces which are mirror images of each other, and this widened portion 36 of the groove 34 forms an elongated opening which extends normal to the bottom face 33' of the base 33. The widened portion 36 of the groove 34 may have a cross section in accordance with the manner in which the stand is manufactured. Thus, if the rounded rear edge of the stand is formed by milling the bar from which the stand is formed, for example, this bar originally having a rectangular cross section, then it is unnecessary to mill the bottom end of the stand, and this bottom end may have its original rectangular cross section. In this case the widened portion 36 of the slot 34 has a rectangular cross section as indicated in Fig. 9 to receive the bottom rectangular portion of the stand. Such a bottom rectangular portion is shown most clearly in Fig. 13 while Fig. 12 clearly indicates how the stand is milled so as to provide it with the converging side surfaces and rounded rear edge, the top faces of the rectangular portion remaining at the bottom of the stand being visible in Fig. 12. Fig. 11 shows the bottom free end portion of the stand 31 without the base 33. Thus, with such an arrangement the original rectangular cross section of the bottom of the stand is placed within the opening 36 which has a shape corresponding to the cross section of the bottom free end of the stand, and then the screw 35 is turned so as to releasably clamp the stand to the base 33.

It is also possible to form the stand by drawing long bars so as to provide them over their entire length with a cross section indicated in Fig. 15. Where the stands are manufactured in this manner, then the widened portion 36 may have the configuration shown at 36' in Fig. 10. In this case also the stand is simply placed at its bottom end in the opening 36' and the screw 35 is tightened in order to releasably clamp the stand to the base. Figs. 14 and 15 illustrate the type of stand which is used with a base having a widened portion 36' in the elongated cutout thereof.

It is desirable to limit the downward movement of the stand with respect to the base, and for this purpose the stand 31 is provided with a shoulder 32 indicated in Fig. 11. Thus, at its shoulder 32 the stand is provided with a downwardly directed face which engages the top face of the base 33 to limit the downward movement of the stand in the manner shown most clearly in Fig. 8. In the same way, the stand of Figs. 14 and 15 is provided at its forward edge with a shoulder 32' which also provides this stand with a downwardly directed surface which engages the top face of the base to limit the downward movement of the stand. Thus, there is no possibility that the bottom end of the stand will extend beyond the bottom face of the base which is to slidably engage a surface on which the work material is located.

It will be understood that each of the elements described above, or two or more together, may also find a useful application in other types of cutting tools differing from the types described above.

While the invention has been illustrated and described as embodied in portable cutting tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A power hand cutting tool, comprising, in combination, a pair of elongated tool carriers respectively located in parallel planes; support means supporting said carriers for reciprocating movement in said planes in axial direction of said elongated tool carriers; drive means carried by said support means and including a drive member rotatable about a given axis; two crank means operatively connected to said drive member of said drive means to be driven thereby, said two crank means arranged adjacent said elongated tool carriers, located beside each other in said axial direction at said elongated tool carriers and connected to said tool carriers for reciprocating the latter back and forth along parallel lines respectively located in said planes and for moving said tool carriers respectively in opposite directions at any given instant, said two crank means being identical and located in a common plane.

2. A power hand cutting tool, comprising, in combination, a pair of elongated tool carriers respectively located in parallel planes; support means supporting said carriers for reciprocating movement in said planes in axial direction of said elongated tool carriers; drive means carried by said support means and including a drive member rotatable about a given axis; two crank means operatively connected to said drive member of said drive means to be driven thereby said two crank means arranged adjacent said elongated tool carriers, located beside each other in said axial direction of said elongated tool carriers and connected to said tool carriers for reciprocating the latter back and forth along parallel lines respecitvely located in said planes and for moving said tool carriers respectively in opposite directions at any given instant; a pair of pins respectively fixed to and extending laterally from said tool carriers; a pair of elongated cutting tools respectively formed with cutouts extending transversely of the operating direction of the cutting tools into which cutouts said pins respectively extend for connecting said tools to said carriers for respective movement therewith; an elongated stand fixed to and extending from said support means and formed with an elongated groove in which both of said tools are located to be guided by said stand for reciprocating movement with said tool carriers; and a plate removably fixed to said support means and engaging a part of said tools for maintaining the latter in operative engagement with said carriers.

3. A power hand cutting tool, comprising, in combination, a pair of elongated tool carriers respectively located in parallel planes; support means supporting said carriers for reciprocating movement in said planes in axial direction of said elongated tool carriers; drive means carried by said support means and including a drive member rotatable about a given axis; two crank means operatively connected to said drive member of said drive means to be driven thereby said two crank means arranged adjacent said elongated tool carriers, located beside each other in said axial direction of said elongated tool carriers and connected to said tool carriers for reciprocating the latter back and forth along parallel lines respectively located in said planes and for moving said tool carriers respectively in opposite directions at any given instant; a pair of pins respectively fixed to and extending laterally from said tool carriers; a pair of elongated cutting tools respectively formed with cutouts extending transversely of the operating direction of the cutting tools into which cutouts said pins respectively extend for connecting said tools to said carriers for respective movement therewith; an elongated stand fixed to and extending from said support means and formed with an elongated groove in which both of said tools are located to be guided by said stand for reciprocating movement with said tool carriers; a plate removably fixed to said support means and engaging a part of said tools for maintaining the latter in operative engagement with said carriers, each of said tools being formed distant from said cutout thereof with an elongated notch parallel to the direction in which said tool is reciprocated; and a cross pin carried by said stand and extending through said notches for maintaining said tools in operative engagement with said stand.

4. In a power hand cutting tool, in combination, support means formed with an elongated cutout having a pair of parallel guide surfaces; a pair of elongated tool carriers located in said cutout in sliding engagement with each other and respectively slidably engaging said guide surfaces of said cutout to be guided thereby for reciprocating movement in axial direction of said elongated tool carriers, one of said tool carriers being longer than the other and being formed with at least one cutout which gives said one tool carrier a mass approximately equal to that of the other tool carrier; and drive means, including two crank means arranged adjacent said elongated tool carriers and located beside each other in said axial direction of said elongated tool carriers, carried by said support means and operatively connected to said tool carriers for simultaneously reciprocating the latter in said cutout in opposite directions.

5. In a power hand tool carrier, in combination, support means; a pair of guide members carried by said support means and defining between themselves an elongated free space; a pair of transmission members respectively located in said space and engaging said guide members to be guided thereby for movement back and forth in said space; a pair of elongated tool carriers respectively fixed to said transmission members for movement therewith in axial direction of said elongated tool carriers; a drive means carried by said support means and including a drive member rotatable about a given axis; and two crank means driven by said drive member of the said drive means said two crank means arranged adjacent said elongated tool carrier, located beside each other in said axial direction of said elongated tool carriers and operatively engaging said transmission members for simultaneously reciprocating the same in the space between said guide means in opposite directions simultaneously.

References Cited in the file of this patent

UNITED STATES PATENTS

| | | |
|---|---|---|
| 139,426 | Scholfield | May 27, 1873 |
| 143,131 | Evard | Sept. 23, 1873 |
| 1,035,524 | Bradley | Aug. 13, 1912 |
| 1,372,665 | Alexander | Mar. 29, 1921 |
| 2,282,728 | Kern | May 12, 1942 |
| 2,305,465 | Bangser | Dec. 15, 1942 |
| 2,492,156 | Kupjack | Dec. 27, 1949 |
| 2,501,631 | Oschwald | Mar. 21, 1950 |
| 2,659,969 | Merkur | Nov. 24, 1953 |
| 2,704,941 | Holford | Mar. 29, 1955 |

FOREIGN PATENTS

| | | |
|---|---|---|
| 19,741 | France | Apr. 15, 1915 |
| | (Add. to 465,130) | |